June 18, 1935.   T. P. TIERNEY, JR   2,005,355
FLOWER CUTTER
Filed March 16, 1934
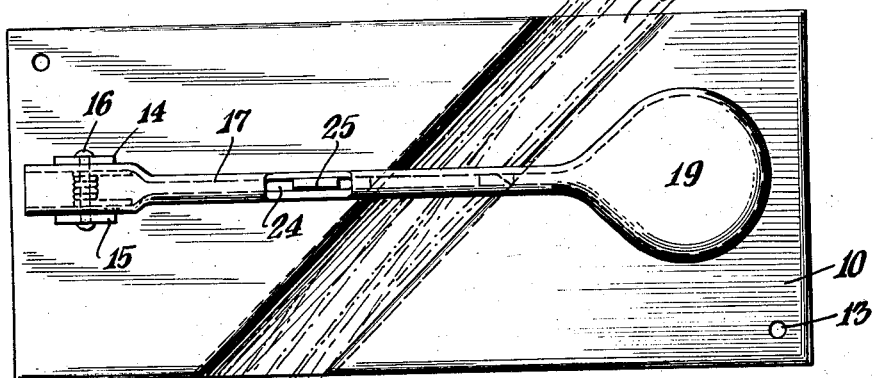
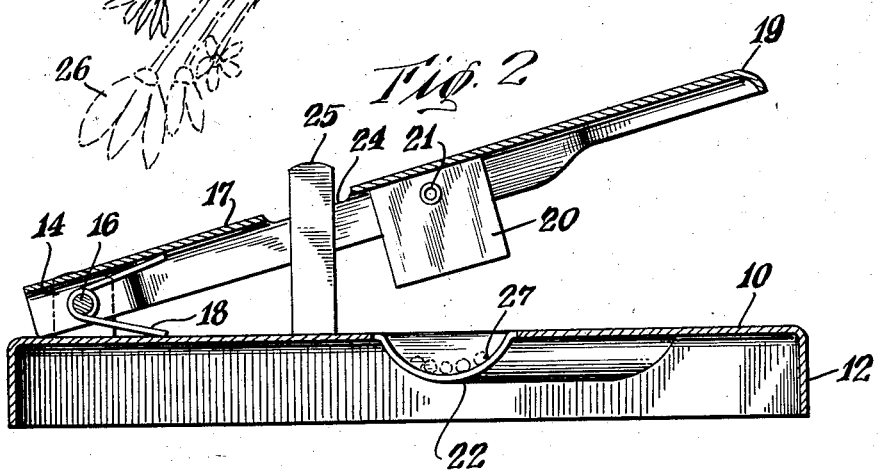
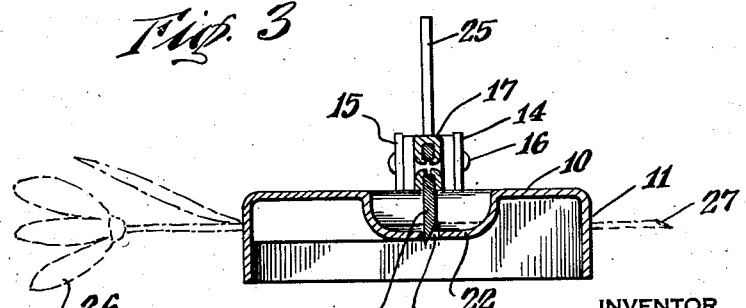
INVENTOR
Thomas P. Tierney, Jr.
BY
ATTORNEY Patented June 18, 1935

2,005,355

UNITED STATES PATENT OFFICE 2,005,355

FLOWER CUTTER

Thomas Patrick Tierney, Jr., Montgomery, N. Y.

Application March 16, 1934, Serial No. 715,877

1 Claim. (Cl. 146—81)

This invention relates to improvements in cutters, particularly cutters for cutting the stems of flowers, and it is the principal object of my invention to provide a cutter for cutting the stems of flowers obliquely.

It is a well known fact that an oblique cut of the stems of flowers will present a larger surface for the entrance of the water into the stems of flowers and thus prolong their life considerably longer than a straight cut.

Another object of my invention is the provision of a flower stem cutter of comparatively simple and therefore inexpensive construction, yet durable and highly efficient in its operation.

A further object of my invention is the provision of a flower stem cutter having a base provided with a comparatively wide, obliquely arranged groove therein for the reception of flower stems, the bottom of which is slotted and oppositely disposed to the cutter which is adapted to be guided against the stems by the operation of the spring controlled hand lever.

A still further object of my invention is the provision of a flower cutter, the blade of which is arranged on a spring controlled operating lever through which a guide post extends for securely guiding the lever during its operation to carry the cutter against the stems of the flowers placed in the obliquely disposed groove for providing an oblique cut.

These and other objects and advantages of my invention will become more fully known as the description thereof proceeds and will then be more specifically defined in the appended claim.

In the accompanying drawing forming a material part of this disclosure:

Fig. 1 is a top plan view of a flower stem cutter constructed according to my invention.

Fig. 2 is a sectional side elevation thereof.

Fig. 3 is a sectional end elevation of the cutter.

As illustrated, the cutter comprises a base of metal or similar suitable material in form of a platform 10 supported by the depending side flanges 11 and end flanges 12 spacing the platform from its support, while openings 13 are provided in the platform to allow the passage of fastening means securing the base to its support.

Near one of its ends the platform 10 carries a pair of upstanding parallel, lugs 14 and 15 spaced from one another and supporting the ends of a cross pin 16.

An operating bar or lever 17 formed by bending the material of the lever upon itself in the direction of its longitudinal axis has one of its ends pivoted on pin 16, while a spring 18 is wound intermediate its ends about pin 16 and engages with one of its ends the inner upper wall of the handle 17 and with its other end the base 10 and has the tendency to hold the lever in an inclined upwardly directed position. The other end of the lever 17 is formed into a handle 19.

A blade or cutter 20 is secured near its upper end, as at 21 to the bar between its side walls and oppositely disposed to a comparatively wide groove 22 diagonally carved into base 10 and having a transverse slot 23 in its bottom.

The bar or lever 17 has a slot 24 in its top through which projects a guide bar 25 having its lower end anchored in base plate 10.

In operation the stems 27 of the flowers 26 are placed into the groove 22 and are cut by the knife or cutter 20 upon its depression by means of handle 19.

It will be understood that I have disclosed the preferred form of my invention as one example only of the many possible ways to practically construct the same and that I may make such changes in the general arrangement thereof and in the construction of its minor details, as come within the scope of the appended claim without departure from the spirit of my invention and the principle involved.

Having thus described my invention what I claim as new and desire to secure by Letters Patent is:

A flower cutter comprising a base provided with an obliquely disposed comparatively wide groove therein having a transverse slot in its bottom obliquely disposed to said groove, a cutter normally held above the groove in said base, said cutter operating through said slot, a bar or lever in form of a housing slotted at its bottom, and pivoted at one end to said base to which said cutter is attached, said lever having a slot, a guide post anchored in the base passing through the slot in said lever to guide the same during its operation, a spring wound about the pivot pin of said bar or lever intermediate its ends and engaging with its outer ends said lever and said base to normally hold the same in upwardly inclined position above said base permitting the depression of said cutter to obliquely cut the stems of flowers placed into the groove of the base upon the depression of said lever by its handle.

THOMAS PATRICK TIERNEY, Jr.